R. B. BETT.
CAR FENDER.
APPLICATION FILED AUG. 21, 1911.
1,006,349.
Patented Oct. 17, 1911.
2 SHEETS—SHEET 1.
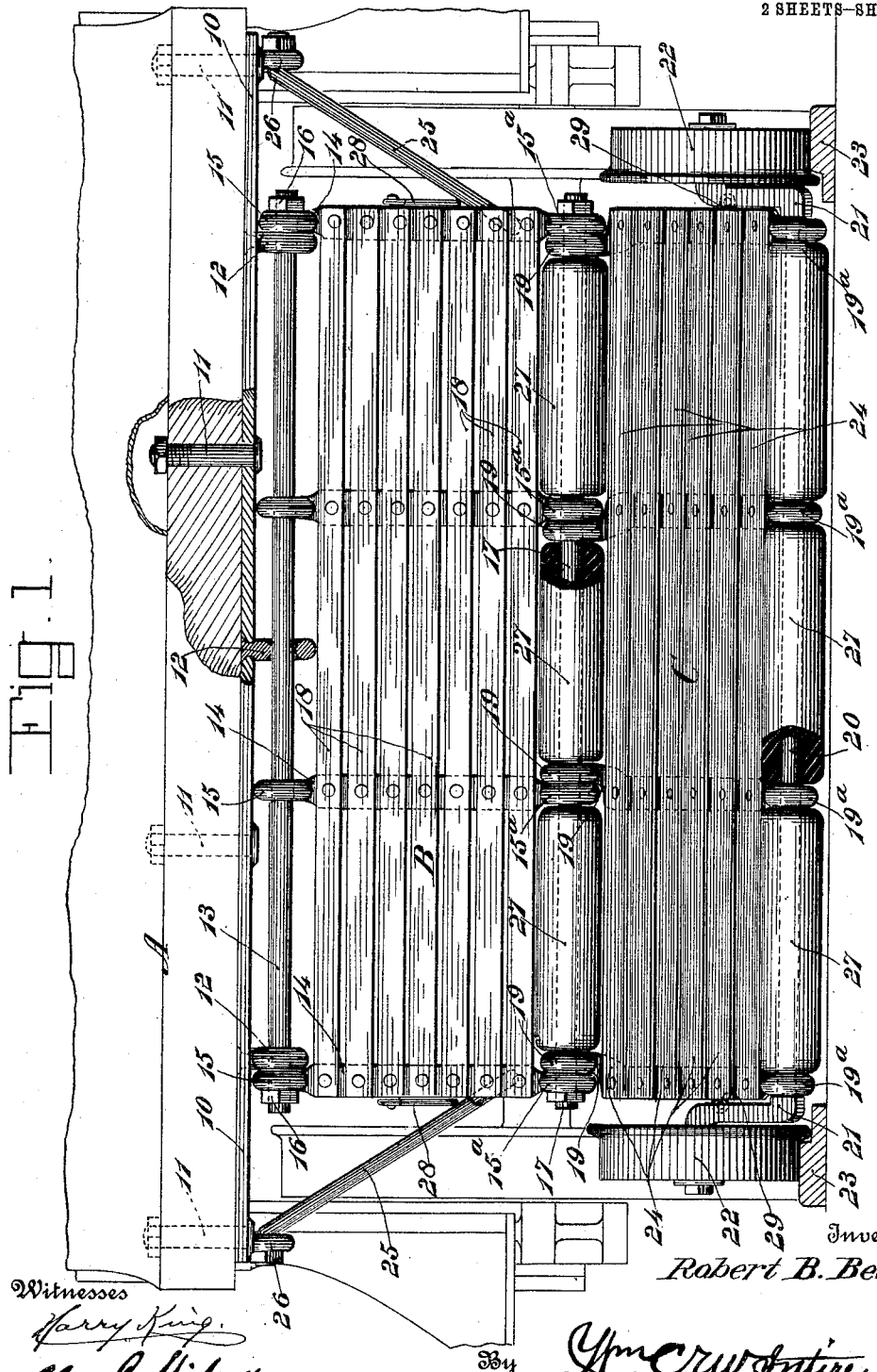
Witnesses
Harry King.
Chas. E. Wilson
Inventor
Robert B. Bett
By Wm. C. W. McIntire
Attorney
COLUMBIA PLANOGRAPH CO., WASHINGTON, D. C.

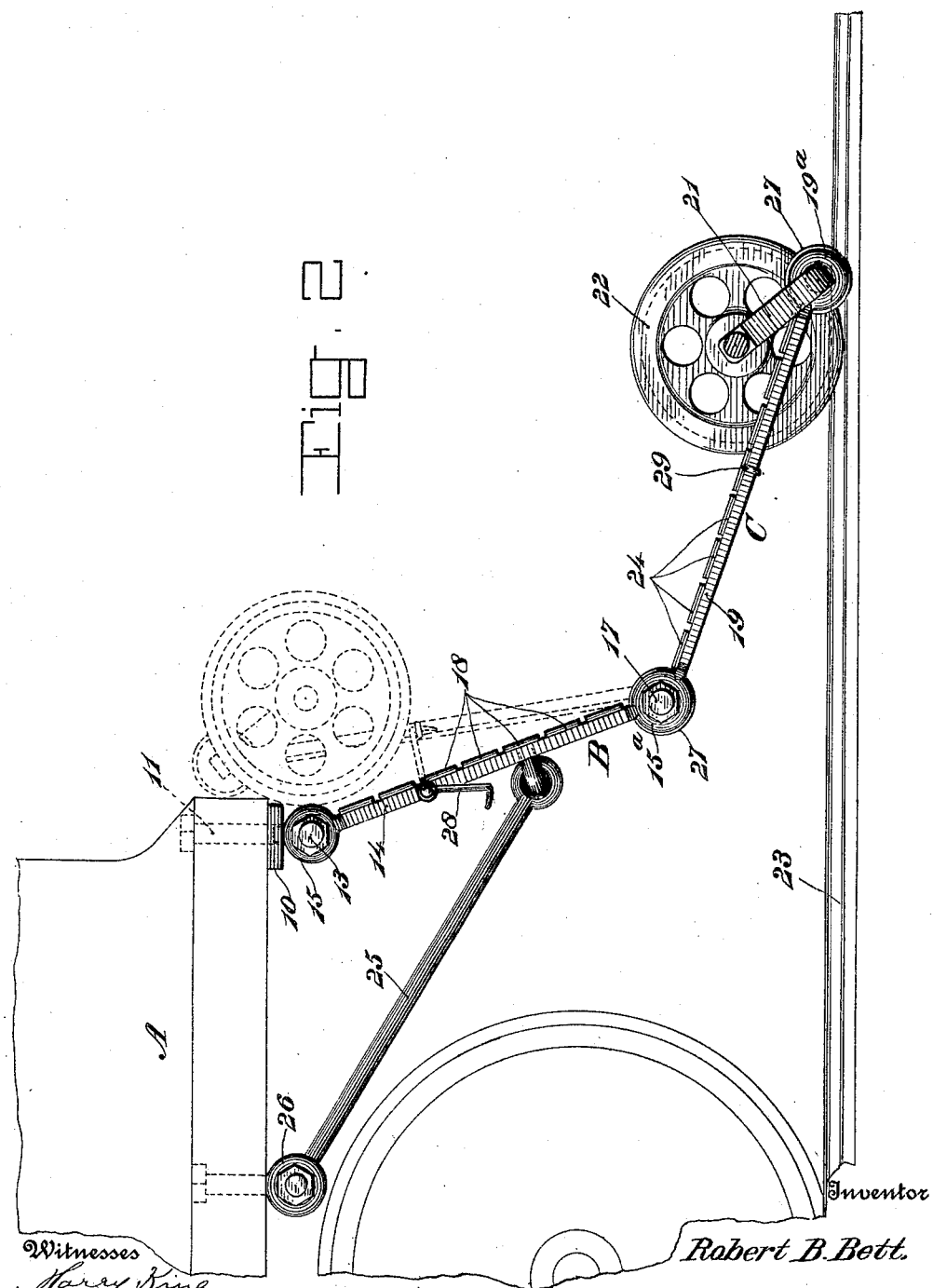

UNITED STATES PATENT OFFICE.

ROBERT BOYD BETT, OF LORD, MARYLAND.

CAR-FENDER.

1,006,349.  Specification of Letters Patent.  Patented Oct. 17, 1911.

Application filed August 21, 1911. Serial No. 645,173.

*To all whom it may concern:*

Be it known that I, ROBERT B. BETT, a citizen of the United States, residing at Lord, in the county of Allegany and State of Maryland, have invented certain new and useful Improvements in Car-Fenders; and I do hereby declare the following to be a full, clear, and exact description of the invention, such as will enable others skilled in the art to which it appertains to make and use the same.

This invention relates to a safety device for cars and particularly to that class of safety devices known as car fenders.

This invention has for its object to provide a car fender wherein the same will operate upon the tracks in advance of the car, and will not be spaced from the surface of said tracks as has heretofore been the custom, thereby eliminating the danger of objects being caught under the fender as has been frequent in the past.

It is also adapted to construct a solid, substantial structure which will support the average weight placed thereon without becoming damaged or broken.

With the above and other objects in view, this invention consists in the construction, combination and arrangement of parts, all as hereinafter more fully described, claimed and illustrated in the accompanying drawings wherein:—

Figure 1 is a front elevation of a fender embodying the details and elements of the present invention, illustrating diagrammatically, a fragmentary section of the car coöperating therewith. Fig. 2 is a side elevation illustrating the fender of the present invention attached to a car, illustrated diagrammatically, and illustrating in dotted lines the fender in a raised position.

A car fender forming the subject matter of the present invention, comprises a plate removably secured with the under side of the bumper of the car, said plate being provided with a plurality of dependent eyes, upon which is mounted a plurality of transversely arranged and dependent bars which carry a series of longitudinal slats or strips which form the principal body portion of the fender. The lower terminals of the bars heretofore referred to coöperate with a longitudinal bar and a series of secondary bars, to which a series of strips or slats are secured. The lower or outer terminals of the secondary bars coöperate with a longitudinal rod, said last named longitudinal rod carrying a plurality of bumpers, said bumpers being constructed of any suitable cushioning material. At the terminals of the last named longitudinal rods are mounted suitable wheels for engaging the tracks in advance of the larger wheels of the trucks of the car. Braces are provided and interposed between the section of the fender directly connected to the car, and the under surface of the car, said fender being connected to the bumper of the car through the instrumentality of the bolts securing the terminals of the plates to the under side of the bumper.

Referring more particularly to the drawings, A indicates diagrammatically the bumper of a car having plate 10 secured to the under side thereof by the bolts 11, said plate being provided with the dependent eyes 12. A longitudinally arranged rod or shaft 13 is mounted in the eyes 12 and has the bars 14 secured thereto through the instrumentality of the bends or loops 15, formed at the upper terminals of said bars. The shaft or rod 13 is retained within the eyes 12 and the bends or loops 15 of the bars 14 by the nuts 16 coöperating with the terminals of said rod or shaft.

The lower terminals of the bars 14 are provided with the bends or loops 15ª, in which operates the intermediate rod or shaft 17. The bars 14 have secured thereto a series of longitudinally arranged slats or bars 18, which in combination with the rods or shafts 13 and 17, form a section indicated generally as B of the fender. The second section of the fender indicated generally as C, is pivotally secured to the shaft or rod 17 by the transverse bars 19, which have their upper terminals offset and provided with loop 19ª, located adjacent to the loops or bends 15ª of the bars 14. The lower terminals of the bars 18 are likewise provided with loops or bends 19ª in which is mounted the shaft or rod 20, said shaft or rod 20 coöperating at its terminals with the off set shafts 21, which carry the small wheels 22 operating on the tracks 23, in advance of the truck wheels of the car and provide a means whereby the fender may be retained adjacent and close to the surface over which the car is operated. A series of longitudinally arranged slats or strips 24 completes the secondary section C of the fender.

A pair of braces 25 are secured to the eyes 26 carried by the bolts 11 securing the terminals of plate 10 to the bumper A and at their lower terminals are secured to the primary section B of the fender. In order to eliminate damage being inflicted upon persons or objects caught in the fender a series of resilient bumpers 27 are mounted on the shafts 17 and 20 and are rotatably mounted between the loops engaging said shafts.

When not in use, the fender is retained in an elevated position by the hook 28 carried by the primary section B coöperating with the eyes 29, carried by the secondary section C.

Having thus fully described my invention, what I claim as new and desire to secure by Letters Patent is:

1. In a fender, the combination of the bumper of a car, with a plate secured to the under side of said bumper dependent eyes carried by the under side of said plate, a primary section pivotally connected to said eyes, comprising a series of transversely arranged bars, and a series of longitudinal slats or strips, secured to said bars, a secondary section pivotally secured to said primary section, and wheels operating at the forward side of said secondary section in advance of said car.

2. In a car fender, in combination with the bumper of a car, a plate secured to the under side of said bumper dependent eyes carried by said plate, a shaft mounted in said eyes, a primary section mounted on said shafts comprising a series of transversely arranged bars having loops formed in the terminals thereof and a plurality of slats or strips carried longitudinally thereby, a shaft or rod carried in the loops at the free terminals of said bars, secondary section pivotally connected to said shafts, comprising a series of transversely arranged bars, having loops formed in the terminals thereof, the inner of said loops being offset and embracing said shaft, and wheels carried by the said secondary section and operating in advance of the wheels of said car.

3. In a fender, the combination with a bumper of a car, of a primary section secured to said bumper, braces interposed between said primary section and said bumper, a secondary section pivotally mounted on said primary section, off set shafts carried by the forward side of said secondary section, wheels carried by said off set shafts, said wheels in combination with said off set shafts adapted to retain the forward side of said secondary section in close proximity with the ground, and resilient cushions mounted on the forward terminals of said primary and secondary sections.

ROBERT BOYD BETT.

Witnesses:
DAVID BETT,
J. E. PRICE.

Copies of this patent may be obtained for five cents each, by addressing the "Commissioner of Patents, Washington, D. C."